US011233932B2

(12) United States Patent
Yasuda

(10) Patent No.: US 11,233,932 B2
(45) Date of Patent: Jan. 25, 2022

(54) FOCUSING POSITION DETECTION METHOD, FOCUSING POSITION DETECTOR, RECORDING MEDIUM, AND FOCUSING POSITION DETECTION PROGRAM

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 17/153,484

(22) Filed: Jan. 20, 2021

(65) Prior Publication Data
US 2021/0250515 A1    Aug. 12, 2021

(30) Foreign Application Priority Data

Feb. 27, 2020 (JP) .............................. JP2020-031528
Feb. 27, 2020 (JP) .............................. JP2020-031529

(51) Int. Cl.
*H04N 5/232* (2006.01)
(52) U.S. Cl.
CPC ............................ *H04N 5/232127* (2018.08)
(58) Field of Classification Search
CPC ................................................ H04N 5/232127
See application file for complete search history.

(56) References Cited

U.S. PATENT DOCUMENTS

| 6,441,855 B1* | 8/2002 | Omata ..................... G02B 7/34 348/356 |
| 2008/0025716 A1* | 1/2008 | Yost ........................ G03B 13/34 396/123 |
| 2008/0074530 A1* | 3/2008 | Okawa ............. H04N 5/232123 348/345 |
| 2010/0315514 A1* | 12/2010 | Uchida ............ H04N 5/232123 348/187 |
| 2015/0181107 A1 | 6/2015 | Park et al. |

(Continued)

FOREIGN PATENT DOCUMENTS

| JP | 07-318784 A | 12/1995 |
| JP | 2016-223931 A | 12/2016 |

OTHER PUBLICATIONS

S. H. Lim et al., "Detection of Out-of-Focus Digital Photographs", HP Laboratories Technical Report, Jan. 20, 2005, pp. 1-4.

(Continued)

*Primary Examiner* — Timothy J Henn
(74) *Attorney, Agent, or Firm* — McDermott Will & Emery LLP

(57) ABSTRACT

In a focusing position detection method, a second step is carried out. The second step includes dividing the object image into a plurality of local regions, obtaining a local value indicating the degree of focalization from the local region for each of the plurality of local regions and obtaining the focus degree on the basis of the plurality of local values. Thus, even when a plurality of object images acquired by imaging an imaging object by using an imager while changing a focal position along an optical axis are relatively dark or include a high-luminance region, it is possible to stably detect a focusing position without repeating detection operations.

13 Claims, 11 Drawing Sheets

(56) References Cited

U.S. PATENT DOCUMENTS

| | | |
|---|---|---|
| 2017/0034427 A1 | 2/2017 | Yu et al. |
| 2018/0249092 A1 | 8/2018 | Kuriyama et al. |
| 2019/0191100 A1* | 6/2019 | Nakamura ....... H04N 5/232127 |
| 2019/0293917 A1 | 9/2019 | Yoshida et al. |
| 2021/0105413 A1* | 4/2021 | Suzuki ................. H04N 5/2353 |

OTHER PUBLICATIONS

Extended European Search Report issued in corresponding European Patent Application No. 21153248.6-1210, dated Jul. 20, 2021.

* cited by examiner

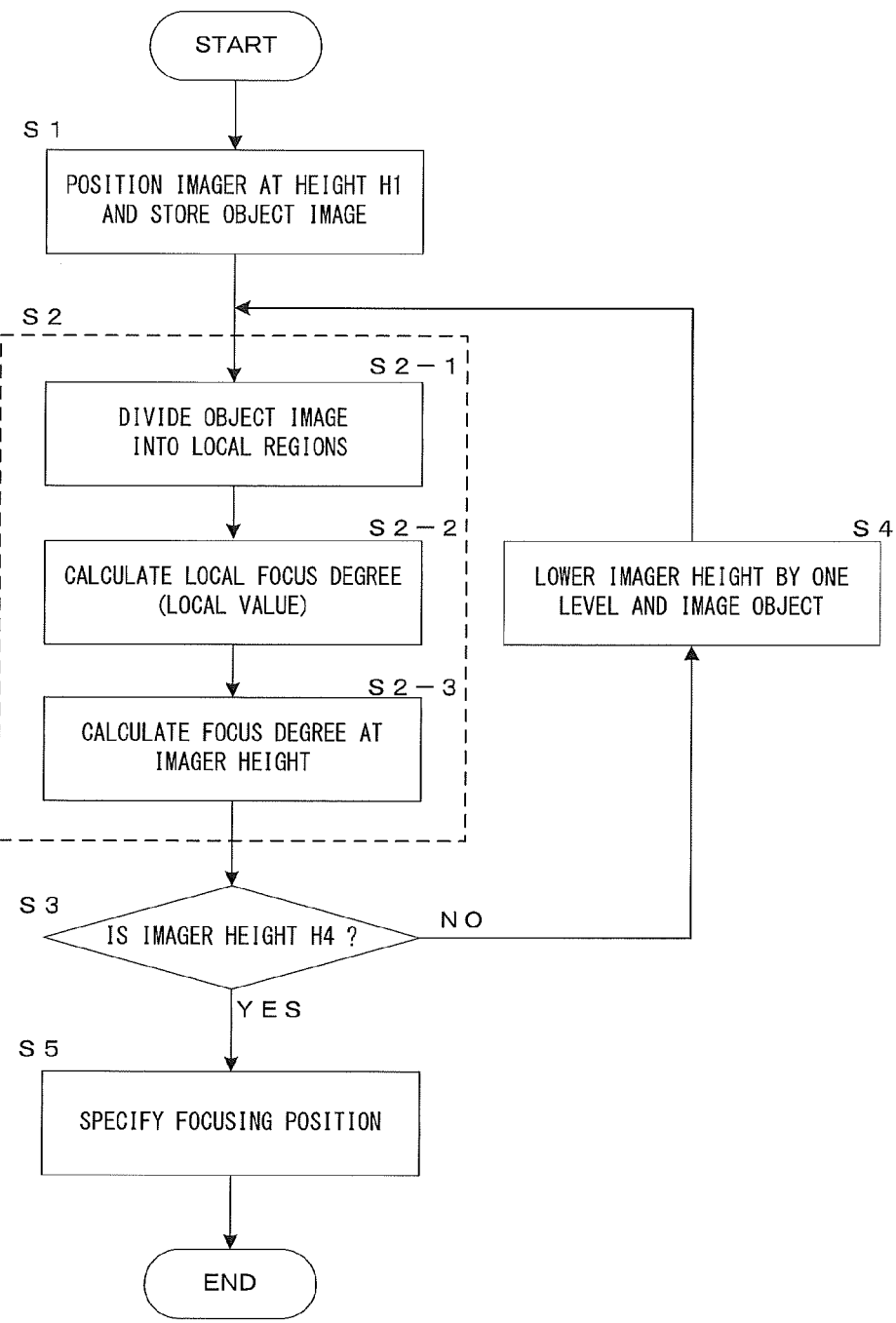

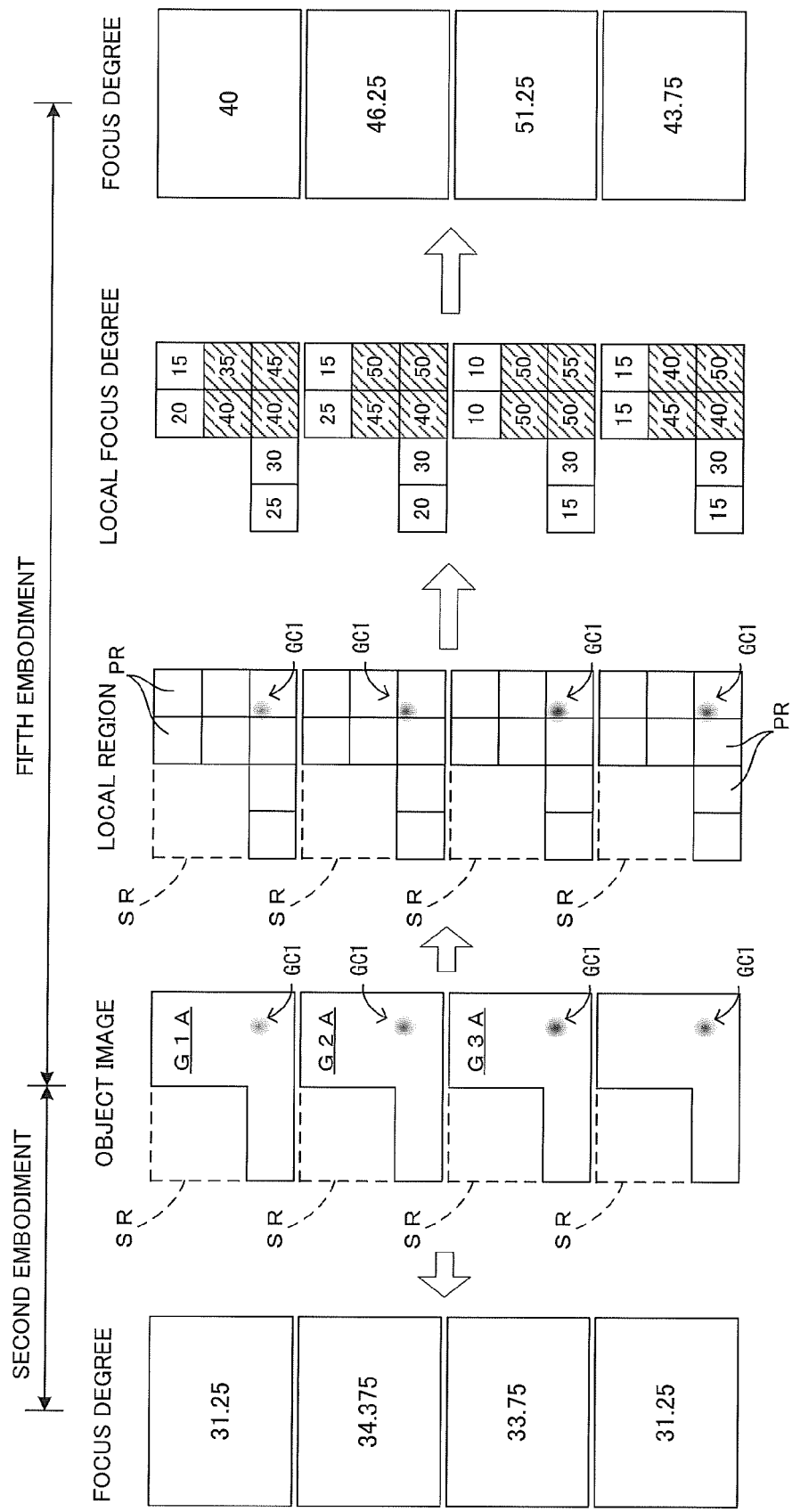

FOCUSING POSITION DETECTION METHOD, FOCUSING POSITION DETECTOR, RECORDING MEDIUM, AND FOCUSING POSITION DETECTION PROGRAM

CROSS REFERENCE TO RELATED APPLICATIONS

Contents disclosed in the specification, drawings and claims of the following Japanese Patent Applications are all incorporated herein by reference:

Japanese Patent Application No. 2020-031528 (filed on Feb. 27, 2020); and

Japanese Patent Application No. 2020-031529 (filed on Feb. 27, 2020).

BACKGROUND OF THE INVENTION

1. Field of the Invention

The present invention relates to a focusing position detection technology for detecting a focusing position on the basis of a plurality of object images acquired by imaging an imaging object by using an imager while changing a focal position along an optical axis.

2. Description of the Related Art

In some cases, for culture and analysis of cells, used are images obtained by imaging a specimen containing the cells. The specimen is prepared by using a flat plate-like container provided with a plurality of wells (recesses), which is referred to as a well plate, a microplate, or the like, or a flat dish-like container referred to as a dish provided with a single well. In order to excellently image the cells which are the imaging objects, it is necessary to adjust a focal position by detecting a focusing position. Then, proposed is a focusing position detection technology for detecting a focusing position on the basis of a plurality of object images acquired by imaging an imaging object by using an imager while changing a focal position along an optical axis (Japanese Patent Application Laid Open Gazette Nos. 7-318784 and 2016-223931, and the like).

SUMMARY OF THE INVENTION

The above object image sometimes locally contains an imaging object image. Herein, under the condition that the luminance of the imaging object image is extremely low, it was difficult to accurately detect the focusing position even by using the above-described conventional technique. In a case where the imaging object is irradiated with excitation light to emit fluorescence and then a fluorescent image (object image) including the imaging object image is acquired, particularly, the fluorescent image generally becomes dark in most cases. For this reason, the difference between the luminance of the imaging object image and noise is small and the object image becomes vulnerable to background noise.

Further, in some cases, the specimen contains a dead cell or the like which is not the original imaging object. An image acquired by imaging such a specimen sometimes includes a high-luminance region in which the luminance of pixels corresponding to the dead cell or the like is extremely high. Then, in the image including the high-luminance region (see the rows (a) and (b) of FIG. 7 described later), it may be possible to detect the focused focal point position after excluding the high-luminance region, but this method cannot sufficiently remove the effect of the dead cell or the like.

Herein, if the setting conditions (light emission time, exposure time, and the like) of an illuminating element and a camera which are included in the imager are adjusted and imaging is performed again, the above-described problem can be solved. In other words, the difference between the luminance of the imaging object image and noise becomes large. Further, generation of the high-luminance region is suppressed. Since the imaging objects are the cells, however, the repeat of imaging causes problems relating to the cells (phototoxicity, fluorescence photobleaching) and a problem of imaging latency time. For this reason, there is a request to avoid the repeat of imaging for detection of the focusing position.

The present invention is intended to solve the above problem, and relates to a focusing position detection technology for detecting a focusing position on the basis of a plurality of object images acquired by imaging an imaging object by using an imager while changing a focal position along an optical axis. Especially, it is an object of the present invention to provide a technology for stably detecting a focusing position without repeating detection operations even when the object images are relatively dark or include a high-luminance region.

A first aspect of the invention is a focusing position detection method, comprising: (a) acquiring a plurality of object images by imaging an imaging object by using an imager while changing a focal position along an optical axis; (b) obtaining a focus degree indicating the degree of focalization, for each of the object images on, the basis of a plurality of local regions obtained by dividing the object image or an image obtained by excluding a saturation region having a luminance higher than a predetermined luminance from the object image; (c) specifying a focusing position on the basis of the plurality of focus degrees.

A second aspect of the invention is a focusing position detector that detects a focusing position on the basis of a plurality of object images acquired by imaging an imaging object by using an imager while changing a focal position along an optical axis, the detector comprising: a focus degree calculation part that calculates a focus degree indicating the degree of focalization of the imager, for each of the plurality of object images, on the basis of a plurality of local regions obtained by dividing the object image or an image obtained by excluding a saturation region having a luminance higher than a predetermined luminance from the object image; and a focusing position specifying part that specifies the focusing position on the basis of the plurality of focus degrees calculated by the focus degree calculation part.

A third aspect of the invention is a non-transitory computer readable recording medium having stored thereon a computer program configured to cause a computer to carry out the focusing position detection method.

A fourth aspect of the invention is a program, causing a computer to carry out the focusing position detection method.

As described above, according to the present invention, even when a plurality of object images acquired by imaging an imaging object by using an imager while changing a focal position along an optical axis are relatively dark or include a high-luminance region, it is possible to stably detect a focusing position without repeating detection steps.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

BRIEF DESCRIPTION OF THE DRAWINGS

FIG. 3 is a flowchart showing one embodiment of a focusing position detection method performed by the imaging apparatus shown in FIG. 1;

FIG. 11 is a diagram schematically showing part of a process performed in a fifth embodiment of the focusing position detection method in accordance with the present invention.

DETAILED DESCRIPTION OF THE PREFERRED EMBODIMENTS

Hereinafter, an embodiment A suitable for a case where an object image is relatively dark and an embodiment B suitable for another case where an object image includes a high-luminance region will be separately described.

The Embodiment A

In the following, one embodiment (first embodiment) will be described as the embodiment A.

Figure 1:
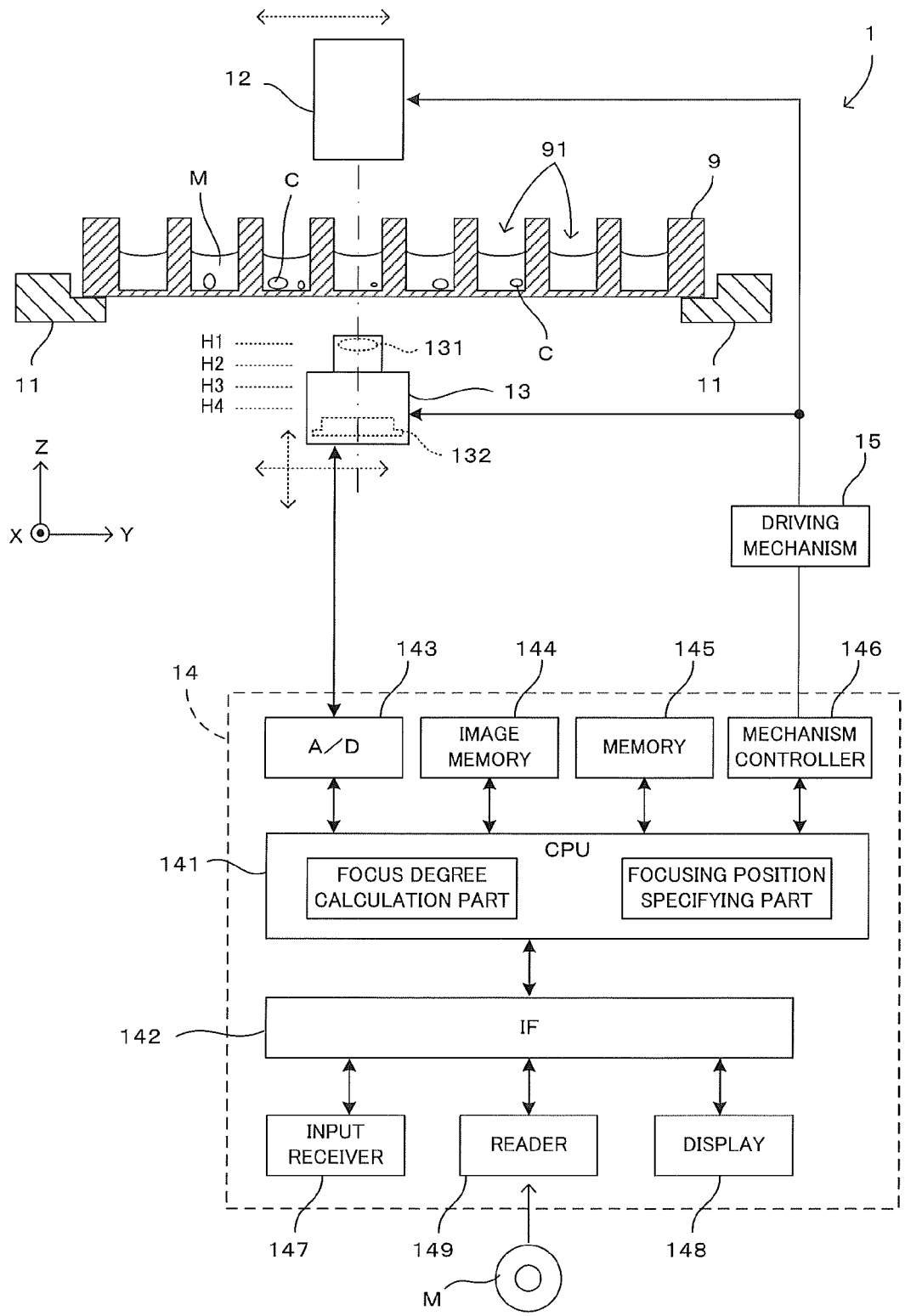
FIG. 1 is a diagram showing a schematic configuration of an imaging apparatus equipped with one embodiment of a focusing position detector in accordance with the present invention.
Figure 2A:
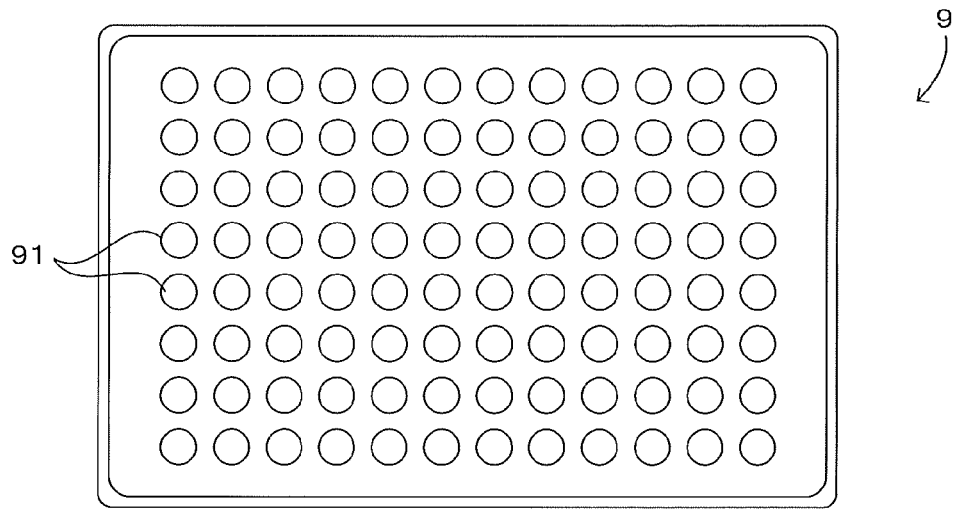
FIG. 2A is a plan view of a well plate used in the imaging apparatus.
Figure 2B:
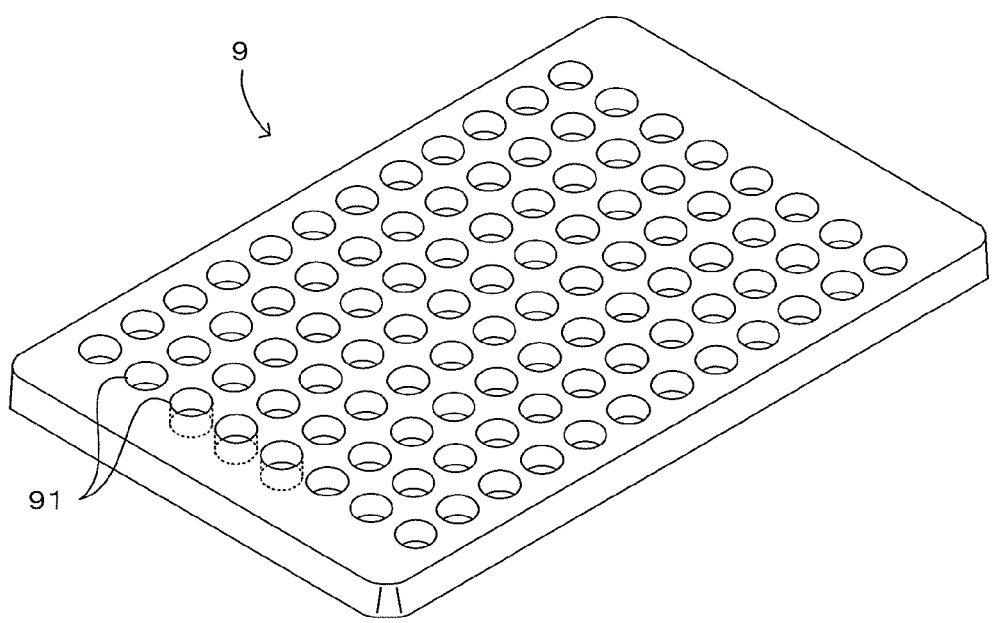
FIG. 2B is a perspective view of the well plate used in the imaging apparatus.

FIG. 1 is a diagram showing a schematic configuration of an imaging apparatus equipped with one embodiment of a focusing position detection apparatus in accordance with the present invention. FIGS. 2A and 2B are drawings showing an example of a well plate used in the invention. Specifically, FIG. 2A is a top view of a well plate and FIG. 2B is a perspective view of the well plate. Here, XYZ orthogonal coordinate axes are set as shown in FIG. 1 to comprehensively show directions in each figure. For example, the XY plane can be considered as a horizontal plane and the Z axis as a vertical axis. In the following, the (−Z) direction is vertically downward.

The imaging apparatus 1 is an apparatus for imaging a living specimen such as cells, cell colonies and bacteria (hereinafter, referred to as "cells and the like" and denoted by C) cultured in the culture medium carried in recesses called the wells 91 formed in the upper surface of the well plate 9. A transparent resin which transmits visible light is, for example, used as a material of the well plate 9. The plurality of wells 91 are regularly arranged in the upper surface of the well plate 9. The wells 91 hold a plurality of cells serving as an imaging object together with a culture medium. Note that the size of the well plate and the number of the wells to be imaged by this imaging apparatus 1 are not limited to these and are arbitrary. For example, well plates having 6 to 384 holes are generally used. Further, this imaging apparatus 1 can be used also in imaging cells and the like cultured, for example, in a flat container called a dish without being limited to use for well plates including a plurality of wells. In this embodiment, the wells 91 are described to have a circular shape in a top view. However, the wells 91 may have another shape such as a rectangular shape or a rounded rectangular shape.

A predetermined amount of a liquid serving as a culture medium M as shown in FIG. 1 is injected into each well 91 of the well plate 9, and the cells and the like C cultured under predetermined culture conditions in this liquid become an imaging object of this imaging apparatus 1. The culture medium M may be added with an appropriate reagent or may be gelled after being injected in a liquid state into the wells 91. In this imaging apparatus 1, for example, cells and the like C cultured, on the inner bottom surfaces of the wells 91 can be imaged.

The imaging apparatus 1 includes a holder 11 which holds the well plate 9, an illuminator 12 arranged above the holder 11, an imager 13 arranged below the holder 11 and a controller 14 which includes a CPU 141 controlling the operation of these components. The holder 11 holds the well plate 9 in a substantially horizontal posture by being held in contact with a peripheral edge part of the lower surface of the well plate 9 carrying sample together with liquid in each well 91.

The illuminator 12 emits an illumination light toward the well plate 9 held by the holder 11. For example, a white LED (light emitting diode) may be used as a light source of the illumination light. A combination of the light source and an appropriate illumination optical system are used as the illuminator 12. The cells or the like in the well 91 disposed to the well plate 9 are illuminated by the illuminator 12 from above.

The imager 13 is provided below the well plate 9 held by the holder 11. In the imager 13, an imaging optical system is arranged at a position right below the well plate 9. An optical axis of the imaging optical system extends in a vertical direction. FIG. 1 shows a side view. A right and left direction of the figure indicates a horizontal direction and an up and down direction of the figure indicates a vertical direction (Z direction).

The imaging of the cells or the like in the well 91 is performed by the imager 13. Specifically, light emitted from the illuminator 12 and incident on the surface of the liquid from above the well 91 illuminates the imaging object. Light transmitted downward from the bottom surface of the well 91 is incident to a light receiving surface of an imaging element 132 via the imaging optical system of the imager 13 including an objective lens 131. An image of the imaging object formed on the light receiving surface of the imaging element 132 by the imaging optical system is imaged by the imaging element 132. The imaging element 132 is an area image sensor having a two-dimensional light receiving surface. A CCD sensor or a CMOS sensor can be used as the imaging element 132.

The imager 13 is capable of moving in the horizontal direction (XY direction) and the vertical direction (Z direction) by a mechanism controller 146 provided in the controller 14. Specifically, the mechanism controller 146 moves the imager 13 in the horizontal direction by operating a driving mechanism 15 based on a control command from the CPU 141. By doing so, the imager 13 moves relative to the well 91 in the horizontal direction. Further, focusing is performed by moving the imager 13 in the vertical direction. This focusing is performed based on the focusing position detected by the focusing position detection method described in detail later. When the imaging is performed in a state that a whole of the well 91 is included in a field of view, the mechanism controller 146 positions the imager 13 in the horizontal direction such that the optical axis of the imaging optical system coincides with the center of the well 91.

Further, the as indicated by arrows with dotted horizontal lines shown in FIG. 1, the driving mechanism 15 moves the illuminator 12 integrally with the imager 13 when the imager 13 is moved in the horizontal direction. Specifically, the illuminator 12 is arranged such that a center of emitted light substantially coincides with the optical axis of the imaging optical system. When the imager 13 moves in the horizontal direction, the illuminator 12 also moves in conjunction with the imager 13. By doing so, whichever well 91 is imaged, the center of the well W and the center of emitted light are always position on the optical axis of the imaging optical system. Consequently, the illuminating condition becomes constant regardless of which well 91 is to be imaged, wherefore imaging conditions can be maintained to be satisfactory.

The image signal output from the imaging element 132 of the imager 13 is send to the controller 14. The image signal is input to an AD converter (A/D) 143 provided in the controller 14 and converted into digital image data. The CPU 141 functions as an image processor which performs appropriate image processings based on the received image data. The controller 14 further includes an image memory 144 for storing image data and a memory 145 for storing programs to be executed by the CPU 141 and data generated by the CPU 141, but these may be integrated. The CPU 141 performs saturation region acquisition processing, a focus degree calculation processing and the like. Thus, the CPU 141 detects the focusing position. In other words, the CPU 141 serves as the "focus degree calculation part", and the "focusing position specifying part" of the present invention, and part of the control program corresponds to an example of the "focusing position detection program" of the present invention.

Besides, the controller 14 is provided with an interface (I/F) 142. The interface 142 has a function of receiving an operation input from a user and presenting information such as processing results to the user. The controller 14 also has a function of performing data exchange with an external apparatus connected via a communication line. To realize the user interface function, an input receiver 147 for receiving an operation input from the user, a display 148 for displaying the messages to the user, a processing result or the like and a reader for reading from a computer-readable non-transitory recording medium M are connected to the interface 142.

Note that the controller 14 may be an exclusive device including above hardware. Further, the controller 14 may be a general-purpose processing device such as a personal computer or a workstation installed with the control program for performing the process described later. Specifically, a general-purpose computer apparatus may be used as the controller 14 of the imaging apparatus 1. When a general-purpose processing device is used as the controller 14, the imaging apparatus 1 may have just a minimal control function for controlling each components of the imager 13 and the like.

Figure 4:
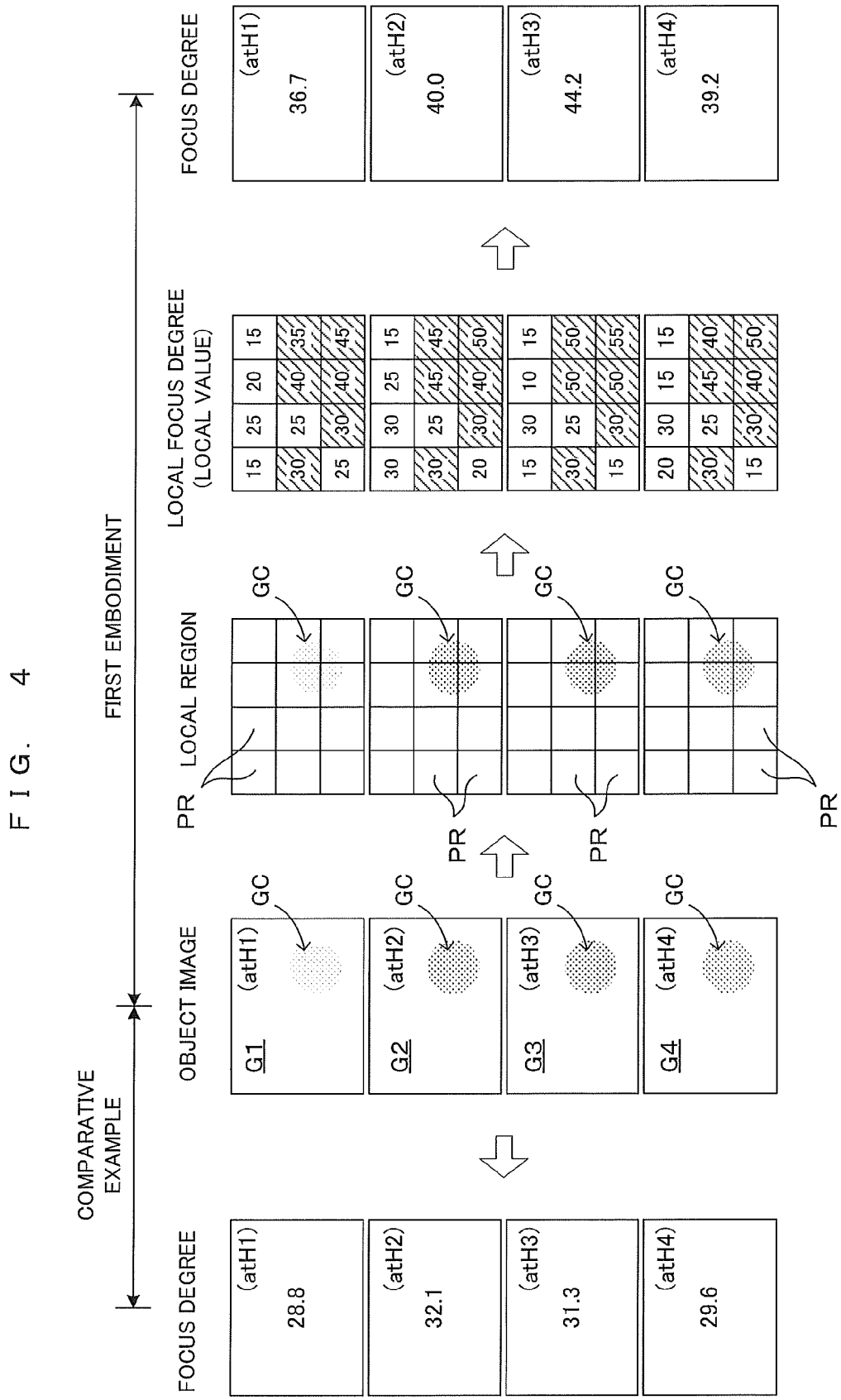
FIG. 4 is a diagram schematically showing part of a process performed in the focusing position detection method.

FIG. 3 is a flowchart showing one embodiment of a focusing position detection method performed by the imaging apparatus shown in FIG. 1. Further, FIG. 4 is a diagram schematically showing part of a process performed in the focusing position detection method. The focusing position detection method is implemented when the CPU 141 provided in the controller 14 executes a pre-installed control program to cause the constituent parts of the apparatus to perform predetermined operations.

First, the driving mechanism 15 drives the imager 13 to set a horizontal position of the imager 13 so that a specific well 91, for example, a well 91 positioned at a central portion may be positioned within a field of view, and to position the imager 13 at an imager height H1 in a vertical direction Z so that a focal position of the objective lens 131 may be a predetermined initial position. In this state, the well 91 is imaged and image data of an object image G1 is stored into the image memory 144 (Step S1). Further, in FIG. 4, an image GC of the cells and the like C which is included in the object image G1 is schematically shown by using dots. The same applies to the image GC of the cells and the like C which is included in each of object images G2 to G4 described later. The characters in parentheses in this figure show the corresponding imager height.

In next Step S2, a focus degree indicating the degree of focalization is obtained from the object image. Immediately after the object image G1 described above is acquired, for example, performed are division of the object image G1 (Step S2-1), calculation of a local focus degree (local value) for each local region (Step S2-2), and calculation of the focus degree corresponding to the object image G1 on the basis of the plurality of local focus degrees (Step S2-3). Specifically, as shown in FIG. 4, the object image G1 is divided into a plurality of (12 in total, in a matrix of 4×3 in the present embodiment) local regions PR (Step S2-1). Then, the focus degree indicating the degree of focalization is calculated for each local region PR (Step S2-2: local value calculation process). In the present specification, the focus degree calculated thus from the local region PR is referred to as a "local focus degree" in order to be distinguished from the focus degree which is conventionally well-known, in other words, the focus degree calculated from the object image G1, and corresponds to the "local value" in the present invention. In other words, in the present embodiment, twelve local focus degrees are calculated by execution of Step S2-2.

As the local focus degree, for example, (1) an index value (average luminance value, contrast, edge strength, or the like) in accordance with the luminance of each of pixels constituting the local region PR, (2) an index value obtained by multiplying the above index value by a coefficient in accordance with the area of the local region PR or the value, (3) an index value obtained by analytical calculation from a luminance histogram of the pixels constituting the local region PR, and the like which are conventionally well-known can be used. In the present embodiment, the luminance of each of pixels constituting the object image G1 is represented by gradations from 0 to 255, and the average luminance value for each local region PR is determined as the local focus degree. Therefore, as can be seen from the observation of the "local region" and the "local focus degree" in FIG. 4, being associated with each other, the local focus degree is relatively low across the entire object image G1 and the local focus degree corresponding to the image GC of the cells and the like C is slightly higher.

After the plurality of local focus degrees are obtained thus with respect to the object image G1, the focus degree in the case where the imager 13 is positioned at the imager height H1 is calculated while correction is performed in accordance with the magnitude of the local focus degree (Step S2-3: focus degree calculation process). In the present embodiment, a correction value is calculated by multiplying the local focus degree by a coefficient in accordance with the magnitude of the local focus degree. In more detail, the above-described twelve local focus degrees are sorted in order of the degree of focalization of the imager 13. A plurality of correction values are calculated by multiplying the local focus degrees from the top to a predetermined order (top 50%) by a value ("1" in the present embodiment) larger than zero as the coefficient. On the other hand, values obtained by multiplying the remaining local focus degrees by zero as the coefficient are substantially excluded from the correction values to be used for the calculation of the focus degree. Specifically, among the "local focus degrees" in FIG. 4, the top six local focus degrees which are hatched are extracted as the correction values, and an average value of these values is obtained as the focus degree in the case where the imager 13 is positioned at the imager height H1. Thus, Step S2 corresponds to an example of the "step (b)" of the present invention, and Steps S2-1, S2-2, and S2-3 correspond to respective examples of the "step (b-1)", the "step (b-2)", and the "step (b-3)".

In next Step S3, it is determined whether or not the imager 13 reaches the lowest imager height H4. During the period while it is determined that the imager 13 does not reach there, Steps S4 and S2 are repeated. Specifically, in Step S4, the imager 13 descends in the vertical direction Z, to thereby lower the imager height by one level, and then the imager 13 positioned at the imager height H2 (H3 or H4) after being changed images the well 91 to acquire the object image G2 (G3 or G4). Thus, performed is the process which corresponds to an example of the "step (a)" of the present invention.

Then, division of the acquired object image G2 (G3 or G4) (Step S2-1), calculation of the local focus degree (local value) for each local region (Step S2-2), and calculation of the focus degree corresponding to the object image G2 (G3 or G4) on the basis of the plurality of local focus degrees (Step S2-3) are performed (Step S2). Thus, obtained are respective focus degrees in the cases where the imager 13 is positioned at the imager heights H2 to H4. Note that in the present embodiment, a change pitch of the imager height for one level is constant.

On the other hand, when "YES" is determined in Step S3, in other words, after the focus degree is obtained for each of the imager heights H1 to H4, the imager height with the highest focus degree is specified as the focusing position (Step S5: step (c) of the present invention), like in the conventional technique. In a case, for example, where the focus degrees are distributed as shown in FIG. 4, the imager height H3 where the focus degree has the highest value is specified as the focusing position.

Herein, from a comparison between a comparative example (the left end of FIG. 4) in which a value obtained by simply averaging the luminances of all the pixels constituting each of the object images G1 to G4 is determined as the focus degree and the present embodiment (the right end of FIG. 4), it can be found that the present embodiment has the following advantages. The comparative example in which the luminances are simply averaged is easily affected by the background noise. For this reason, the amount of variation of the focus degree in accordance with the change of the imager height (H1 to H4) is small, and the possibility that the focusing position may be wrongly detected becomes high. In contrast to this, in the present embodiment, the focus degree for each of the object images G1 to G4 is obtained while excluding a region in which the local focus degree does not fall within the top 50%, i.e., a background noise region having high probability that the image GC of the cells and the like C is not included. For this reason, the amount of variation of the focus degree in accordance with the change of the imager height (H1 to H4) is large, and the focusing position can be detected more accurately. As a result, even when the object images G1 to G4 are relatively dark, it is possible to stably detect the focusing position without repeating detection operations.

The Embodiment B

Next, with reference to FIGS. 5 to 11, the embodiment B will be described. Hereinafter, as the embodiment B, four embodiments (the second to fifth embodiments) will be described, and constituent elements identical to those in the embodiment A are represented by the same or corresponding reference signs and description thereof will be omitted.

Figure 5:
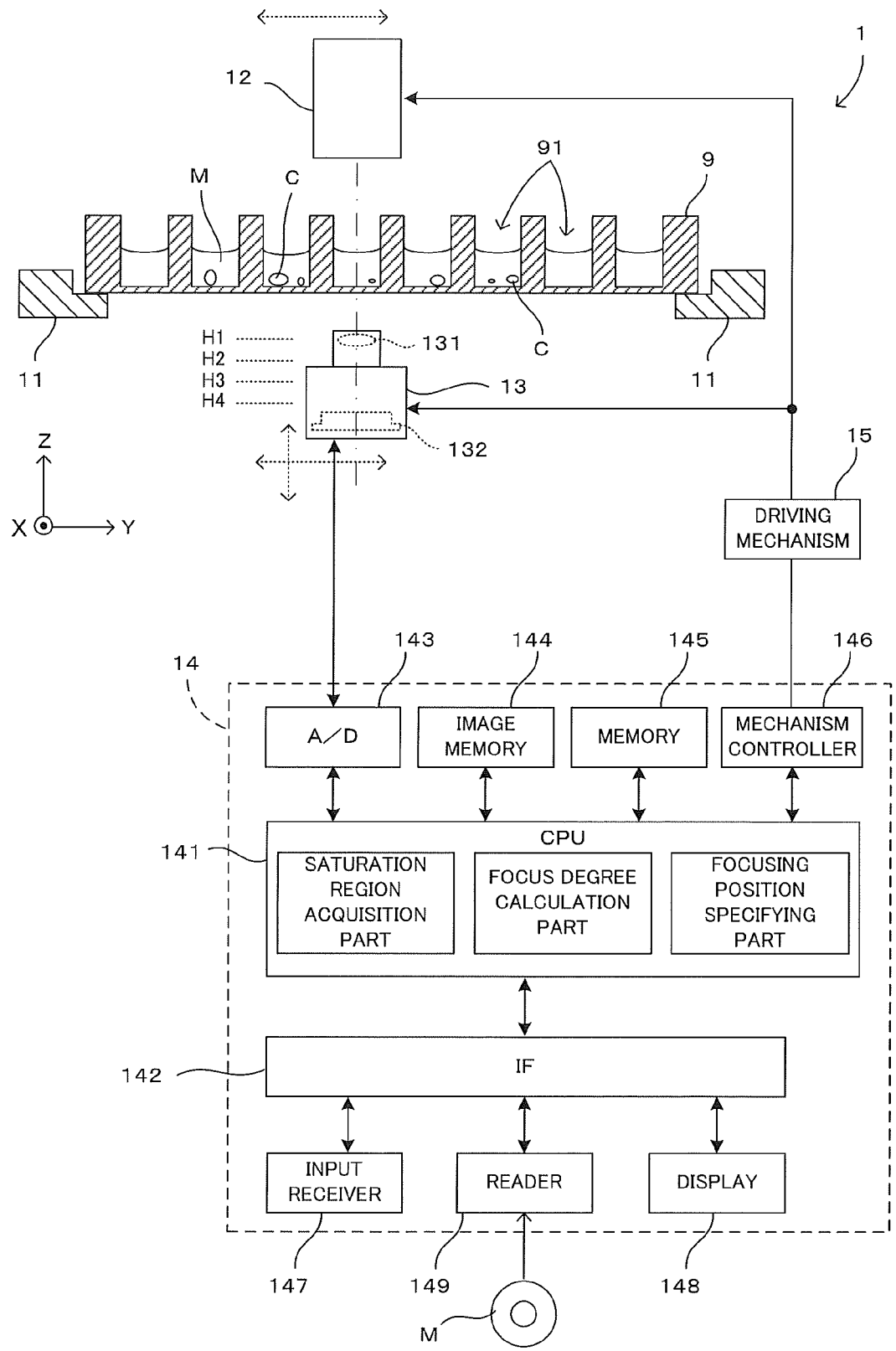
FIG. 5 is a diagram showing a schematic configuration of an imaging apparatus equipped with a second embodiment of the focusing position detector in accordance with the present invention.

FIG. 5 is a diagram showing a schematic configuration of an imaging apparatus equipped with the second embodiment of the focusing position detector in accordance with the present invention. The second embodiment is largely different from the first embodiment (the embodiment A) in that the CPU 141 has a saturation region acquisition part and part of the process performed by the CPU 141 is changed. Specifically, the CPU 141 executes a control program stored in the memory 145 to perform a saturation region acquisition process, a focus degree calculation process, a focusing position specifying process, and the like which are described later, to thereby detect the focusing position. In other words, the CPU 141 serves as the "saturation region acquisition part", the "focus degree calculation part", and the "focusing position specifying part" of the present invention, and part of the control program corresponds to an example of the "focusing position detection program" of the present invention.

Figure 6:
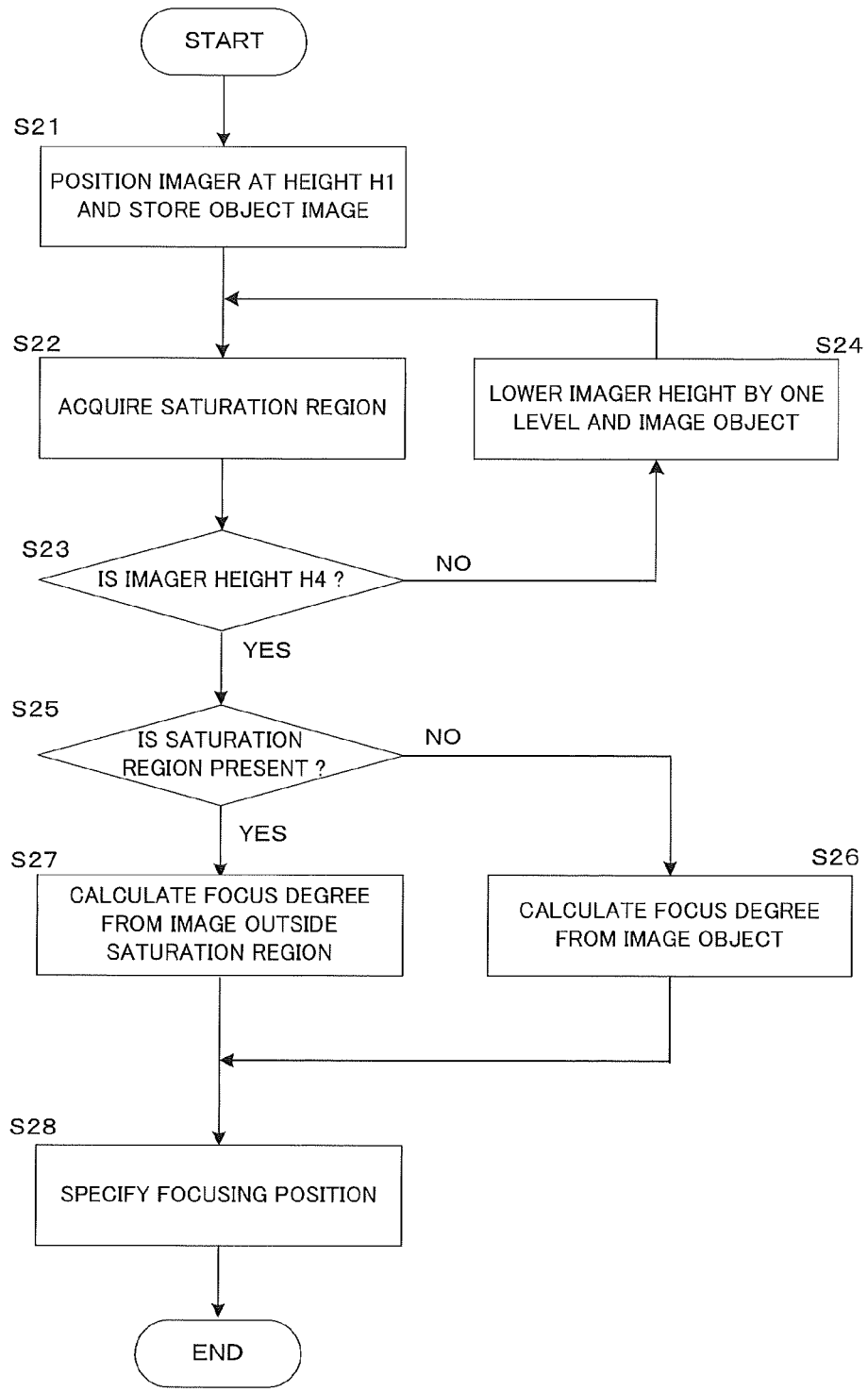
FIG. 6 is a flowchart showing the second embodiment of a focusing position detection method performed by the imaging apparatus shown in FIG. 5.
Figure 7:
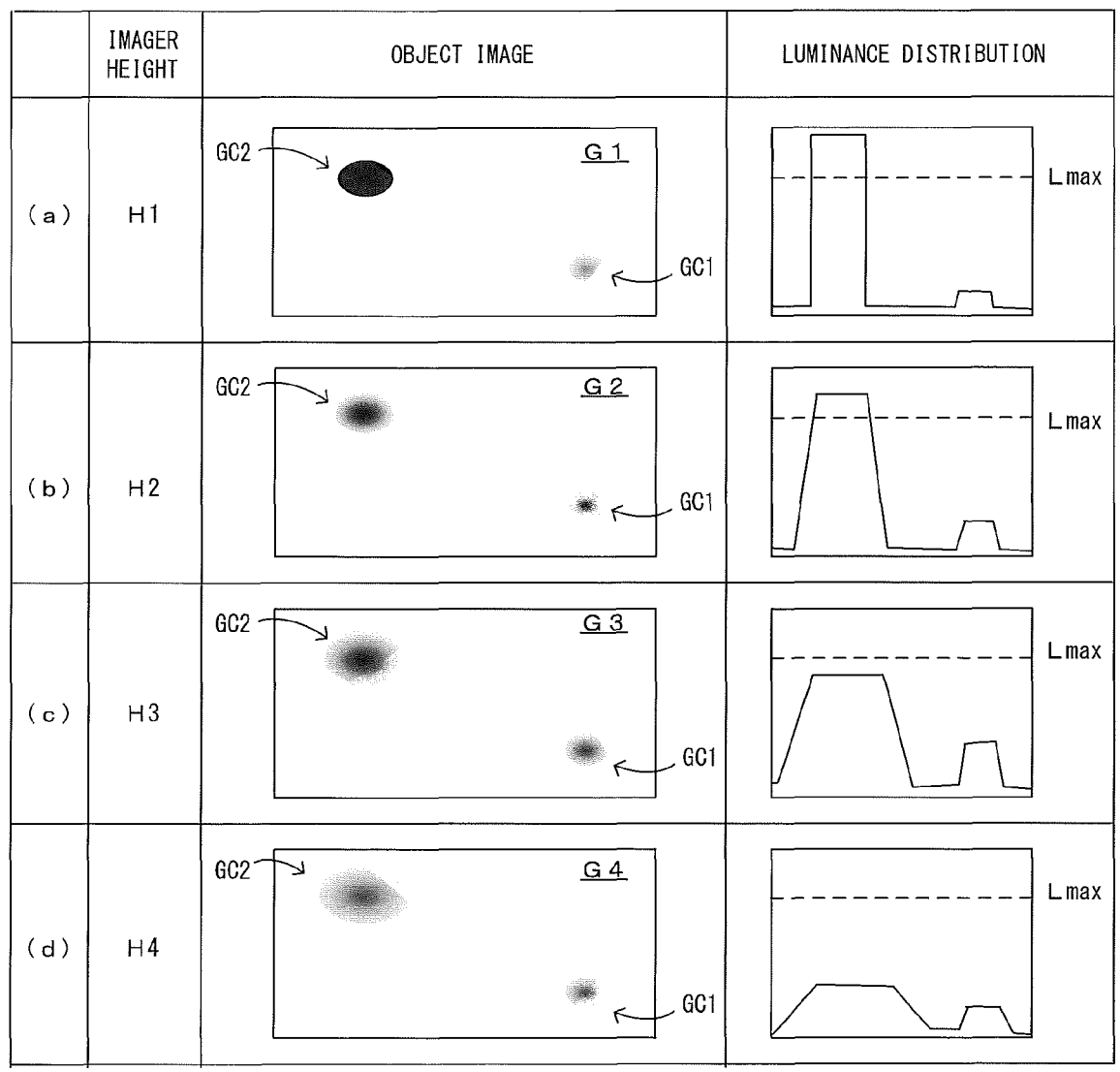
FIG. 7 is a diagram showing exemplary object images acquired by an imager.

FIG. 6 is a flowchart showing the second embodiment of the focusing position detection method performed by the imaging apparatus shown in FIG. 5. Further, FIG. 7 is a diagram showing exemplary object images acquired by the imager. The focusing position detection method is implemented when the CPU 141 provided in the controller 14 executes a pre-installed control program to cause the constituent parts of the apparatus to perform predetermined operations.

First, the driving mechanism 15 drives the imager 13 to set the horizontal position of the imager 13 so that a specific well 91, for example, a well 91 positioned at a central portion may be positioned within a field of view, and to position the imager 13 at the imager height H1 in the vertical direction Z so that a focal position of the objective lens 131 may be a predetermined initial position. In this state, the well 91 is imaged and the image data of the object image G1 is stored into the image memory 144 (Step S21). The object image G1 which is acquired thus sometimes includes an image GC2 of a dead cell, together with the image GC1 of the cells and the like C which should be originally imaged, as shown in the row (a) of FIG. 7. Among these images, the luminance of each of the pixels constituting the image GC1 corresponds to the light which is fluorescently emitted from the cells and the like C irradiated with the excitation light and has a relatively low value. In contrast to this, the luminance of each of pixels constituting the image GC2 becomes extremely high in some cases. As a result, when it is intended to detect the focusing position to be used for imaging the cells and the like C as the imaging object, the presence of the image GC2 disadvantageously becomes one of the main factors causing deterioration in the detection accuracy.

Then, in the present embodiment, after executing Step S21 described above, Steps S22 to S24 are further repeatedly performed. The four object images G1 to G4 are thereby acquired by imaging the cells and the like C by using the imager 13 while changing the distance from the imager 13 to the cells and the like C by four levels, in other words, changing the focal position along the optical axis (these Steps correspond to the "step (a)" of the present invention). Further, performed is acquisition of a saturation region having a luminance higher than a predetermined luminance Lmax, i.e., the saturation region acquisition process (which corresponds to the "step (b-4)" of the present invention).

Figure 8:
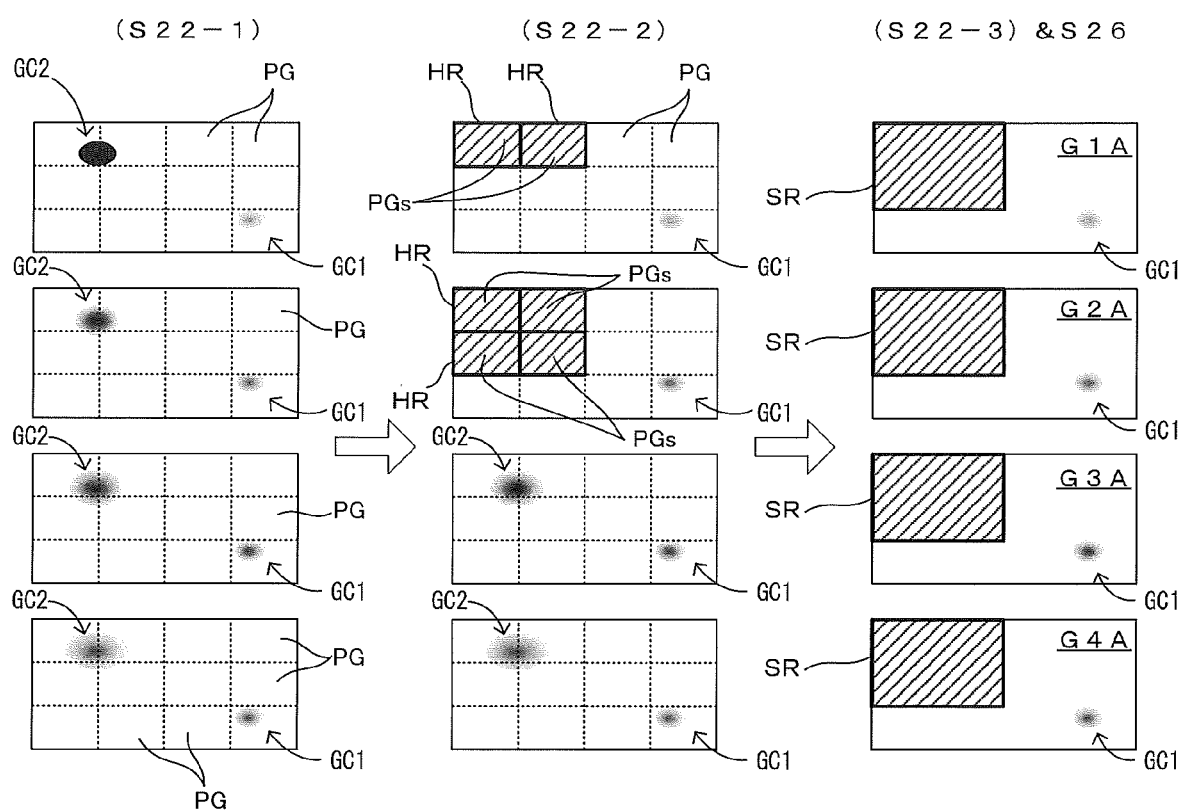
FIG. 8 is a diagram schematically showing details of a saturation region acquisition process and a relation between an image to be used for calculation of the focus degree and a saturation region.

FIG. 8 is a diagram schematically showing details of the saturation region acquisition process and a relation between an image to be used for calculation of the focus degree and the saturation region. In next Step S22, the object image G1 is divided into a plurality of (12 in total, in a matrix of 4×3 in the present embodiment) local images PG (Step S22-1: step (b-5-1) of the present invention). Then, a region in which a local image PG having a luminance higher than the predetermined luminance Lmax is present, i.e., a high-luminance region HR is obtained (Step S22-2: step (b-5-2) of the present invention). The determination on whether or not each local image PG has a luminance higher than the predetermined luminance Lmax can be performed on the basis of, for example, the number of pixels each having a luminance higher than the predetermined luminance Lmax among a plurality of pixels constituting the local image PG. In this point, the same applies to the third embodiment described later.

Further, a high-luminance local image PG having a luminance higher than the predetermined luminance Lmax is referred to as a "high-luminance local image PGs" as appropriate. Furthermore, in order to explicitly show the high-luminance region HR and the high-luminance local image PGs, the high-luminance region HR is surrounded by a thick line in (S22-2) of FIG. 8 while the high-luminance local image PGs is hatched. After the high-luminance region HR is obtained thus, the saturation region is acquired on the basis of the high-luminance region HR (Step S22-3: step (b-5-3) of the present invention). Such a saturation region acquisition process (which corresponds to an example of the step (b-5)) is sequentially performed on the object image G1 and then on the object images G2 to G4.

In the present embodiment, as shown in FIG. 8, the high-luminance region HR in the object image G2 is extended to a wider range from the high-luminance region HR in the object image G1. In other words, the saturation region SR consisting of the high-luminance regions HR in the object image G2 includes the saturation region (not shown) consisting of the high-luminance regions HR in the object image G1. Moreover, as shown in the column of "luminance distribution" of FIG. 7, the luminance distribution of the image GC2 has a sharp profile at the focal position (imager height H1), and on the other hand, as the distance from the focal position becomes larger, the luminance becomes lower around the contour and on the whole while the luminance distribution has a profile with its skirt part becoming wider. For this reason, the luminance of the image GC2 of the dead cell included in each of the object images G3 and G4 is not higher than the predetermined luminance Lmax but is equal to or higher than that of the image GC1 of the cells and the like C, and there is high possibility that the detection of the focusing position may be thereby affected. Then, in the present embodiment, the above-described saturation region SR is regarded as a range in which the detection of the focusing position is inhibited in each of the object images G1 to G4, and the focus degree is calculated with the saturation region SR taken into consideration as described later.

On the other hand, when none of the object images G1 to G4 include the image GC2 of the dead cell or the like, no saturation region SR is present and therefore the detection of the focusing position can be performed by using the object images G1 to G4 as they are, like in the conventional technique.

Then, in next Step S25, it is determined whether or not the saturation region SR is present. When it is determined in Step S25 that the saturation region SR is not present, the focus degree is calculated from the corresponding one of the object images G1 to G4 with respect to each of the imager heights H1 to H4 (Step S26: step (b-5) of the present invention).

In contrast to this, when it is determined in Step S25 that the saturation region SR is present, the image of the saturation region SR is not used for the calculation of the focus degree with respect to any one of the imager heights H1 to H4. Specifically, the focus degree indicating the degree of focalization is obtained from an image G1A obtained by excluding the saturation region SR from the object image G1 (Step S27). Further, the focus degree indicating the degree of focalization is obtained from an image G2A obtained by excluding the saturation region SR from the object image G2. The focus degree indicating the degree of focalization is obtained from an image G3A obtained by excluding the saturation region SR from the object image G3. The focus degree indicating the degree of focalization is obtained from an image G4A obtained by excluding the saturation region SR from the object image G4. Such a process of acquiring the focus degree corresponds to an example of the "step (b-6)".

After the calculation of the respective focus degrees of the imager heights H1 to H4 is completed, the imager height with the highest focus degree is specified as the focusing position (Step S28: step (c) of the present invention), like in the conventional technique.

As described above, according to the second embodiment, when the object image includes a high-luminance image such as the image GC2 of the dead cell or the like, the image of the saturation region SR is not used for the calculation of the focus degree. Moreover, as shown in FIG. 8, with respect to not only the object images G1 and G2 in which the high-luminance region HR appears but all the object images G1 to G4, the image of the saturation region SR is not used for the calculation of the focus degree. Therefore, it is possible to reliably eliminate the effect of the dead cell or the like and detect the focusing position more accurately. As a result, even when all or part of the object images G1 to G4 include the high-luminance region HR, it is possible to stably detect the focusing position without repeating detection operations.

Figure 9:
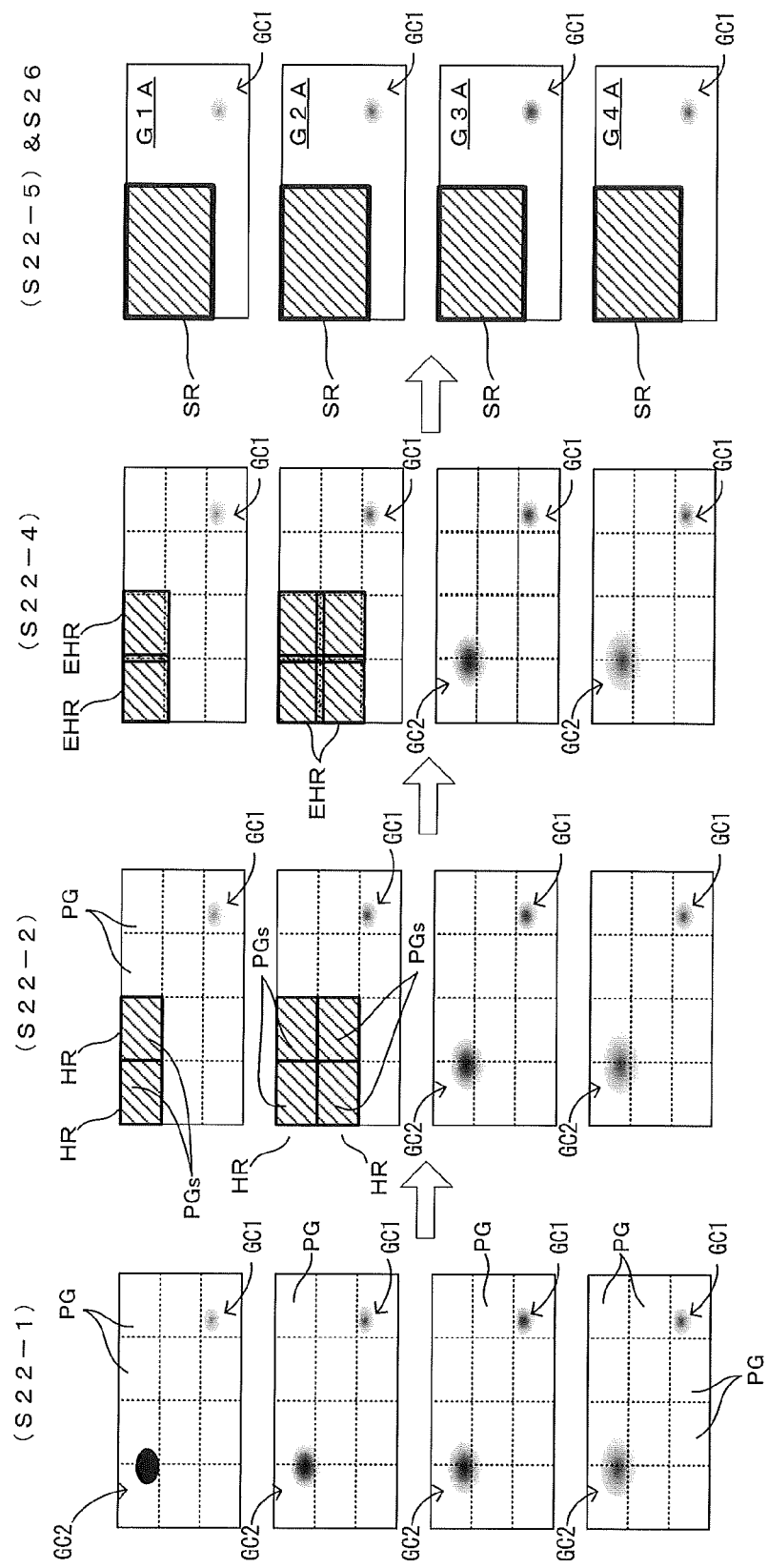
FIG. 9 is a diagram schematically showing details of a saturation region acquisition process in a third embodiment of the focusing position detection method in accordance with the present invention and a relation between an image to be used for calculation of the focus degree and the saturation region.

FIG. 9 is a diagram schematically showing details of the saturation region acquisition process in the third embodiment of the focusing position detection method in accordance with the present invention and a relation between an image to be used for calculation of the focus degree and the saturation region. The third embodiment is largely different from the second embodiment in that an expanded high-luminance region EHR obtained by expanding the high-luminance region HR by a predetermined amount is obtained and the saturation region SR is determined on the basis of the expanded high-luminance region EHR. Further, the other constituent elements and operation are basically the same as those in the second embodiment. Therefore, description will be made below, centering on the difference, and the constituent elements and the operation identical to those in the second embodiment are represented by the same reference signs and description thereof will be omitted.

In Step S22 of the third embodiment, like in the second embodiment, each of the object images G1 to G4 is divided into twelve local images PG (Step S22-1: step (b-5-1) of the present invention), and then a region in which the local image PG having a luminance higher than the predetermined luminance Lmax is present, i.e., the high-luminance region HR is obtained (Step S22-2: step (b-5-2) of the present invention). In the third embodiment, subsequently, each high-luminance region HR is expanded by a predetermined amount (Step S22-4: step (b-5-4) of the present invention). This expanded region is the expanded high-luminance region EHR, and the saturation region SR is acquired on the basis of the expanded high-luminance region EHR (Step S22-5: step (b-5-5) of the present invention).

Then, when the saturation region SR is present as shown in FIG. 9, like in the second embodiment, the image of the saturation region SR is not used for the calculation of the focus degree with respect to any one of the imager heights H1 to H4. Then, the focus degree indicating the degree of focalization is obtained from the images G1A, G2A, G3A, and G4A outside the saturation regions SR. After that, the imager height with the highest focus degree is specified as the focusing position, like in the conventional technique.

As described above, in the third embodiment, the same action and effect as those in the second embodiment can be produced. Moreover, corresponding to the luminance distribution of the image GC2 which has a profile with its skirt part becoming wider as shown in FIG. 7, the skirt part is included into the expanded high-luminance region EHR by expanding the high-luminance region HR and the expanded high-luminance region EHR is taken into the saturation region SR. Therefore, the skirt part, i.e., the image having a luminance which is not higher than the predetermined luminance Lmax but sufficiently higher than that of the image GC1 of the cells and the like C is also not used for the calculation of the focus degree. As a result, it is possible to reliably eliminate the effect of the dead cell or the like and achieve more accurate detection of the focusing position.

Further, though the expanded high-luminance region EHR is obtained by expanding each high-luminance region HR in the third embodiment, the expanded high-luminance region EHR may be acquired by expanding a region formed of a plurality of high-luminance regions HR which are connected to one another (for example, a region formed of two aligned high-luminance regions HR or a region formed of four clustered high-luminance regions HR in FIG. 9) by a predetermined amount. In this point, the same applies to the fourth embodiment described next.

Figure 10:
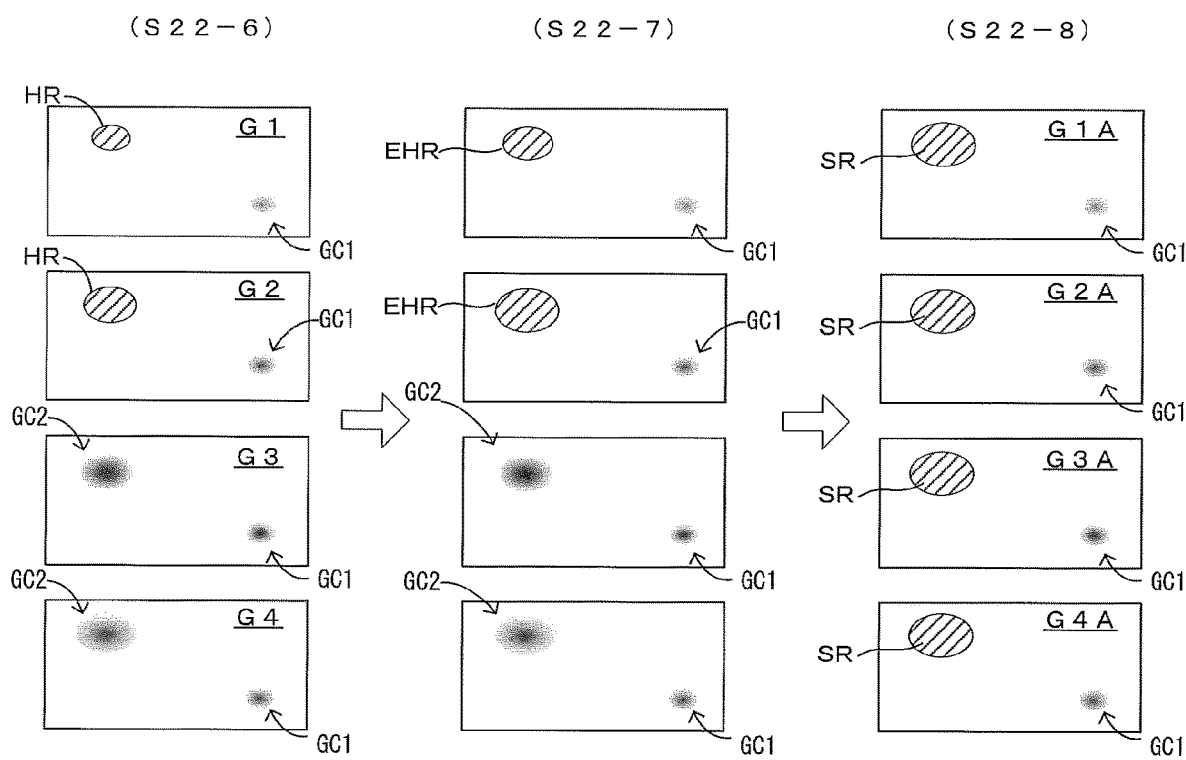
FIG. 10 is a diagram schematically showing details of a saturation region acquisition process in a fourth embodiment of the focusing position detection method in accordance with the present invention and a relation between an image to be used for calculation of the focus degree and the saturation region.

FIG. 10 is a diagram schematically showing details of the saturation region acquisition process in the fourth embodiment of the focusing position detection method in accordance with the present invention and a relation between an image to be used for calculation of the focus degree and the saturation region. The fourth embodiment is largely different from the second embodiment in that the high-luminance region HR is obtained without dividing the object image into a plurality of local images and the saturation region SR is determined on the basis of the expanded high-luminance region EHR like in the third embodiment. Further, the other constituent elements and operation are basically the same as those in the second embodiment. Therefore, description will be made below, centering on the difference, and the constituent elements and the operation identical to those in the second embodiment are represented by the same reference signs and description thereof will be omitted.

Though the saturation region SR is derived in units of local images PG in the second and third embodiments, the saturation region SR is derived through the following stage in Step S22 of the fourth embodiment. Specifically, a region having a luminance higher than the predetermined luminance Lmax is acquired as the high-luminance region HR in the first stage (Step S22-6: step (b-5-6) of the present invention). Then, the high-luminance region HR is expanded by a predetermined amount, to thereby acquire the expanded high-luminance region EHR (Step S22-7: step (b-5-7) of the present invention), and further the saturation region SR is acquired on the basis of the expanded high-luminance region EHR (Step S22-8: step (b-5-8) of the present invention). Herein, the technical significance of obtaining the expanded high-luminance region EHR lies in improvement in the accuracy of the detection of the focusing position, which is achieved by causing the skirt part of the luminance distribution (a region having a luminance which is not higher than the predetermined luminance Lmax but sufficiently higher than that of the image GC1 of the cells and the like C) not to be used for the calculation of the focus degree, like in the third embodiment.

Then, when the saturation region SR is present as shown in FIG. 10, like in the second and third embodiments, the image of the saturation region SR is not used for the calculation of the focus degree with respect to any one of the imager heights H1 to H4. Then, the focus degree indicating the degree of focalization is obtained from the images G1A, G2A, G3A, and G4A outside the saturation regions SR. After that, the imager height with the highest focus degree is specified as the focusing position, like in the conventional technique.

As described above, in the fourth embodiment, the same action and effect as those in the second and third embodiments can be produced. Moreover, since only the region having a luminance higher than the predetermined luminance Lmax and the region obtained by expanding the above region are acquired as the saturation region SR in the fourth embodiment, the following action and effect can be produced. In the second and third embodiments, since the high-luminance region HR is obtained in units of local images PG, a region which is within a range of the local image PG but is sufficiently far away from the region having a luminance higher than the predetermined luminance Lmax is also sometimes identified as the high-luminance region HR. For this reason, luminance data serving as a basis for the calculation of the focus degree are sometimes insufficient. On the other hand, in the fourth embodiment, the luminance data of the region which is sufficiently far away from the region having a luminance higher than the predetermined luminance Lmax (the region other than the expanded high-luminance region EHR) serve as a basis for the calculation of the focus degree. Therefore, it is possible to detect the focusing position on the basis of a larger amount of data.

Though the images G1A, G2A, G3A, and G4A which exclude the saturation region SR are obtained in the above-described second to fourth embodiments, the main image included in these images is the image GC1 of the cells and the like C which are irradiated with the excitation light as the imaging object to emit fluorescence, and the images G1A to G4A are generally dark. For this reason, the difference between the luminance of the image GC1 and noise is small and the images are vulnerable to background noise. Then, the focus degree may be calculated from the images G1A to G4A by the method described below (the fifth embodiment).

FIG. 11 is a diagram schematically showing part of a process performed in the fifth embodiment of the focusing position detection method in accordance with the present invention. In the fifth embodiment, division of the object image, calculation of the local focus degree (local value) for each local region, and calculation of the focus degree corresponding to the object image on the basis of a plurality of local focus degrees are performed for each of the object images G1A to G4A. Herein, description will be made on the process for the object image G1A and description on the processes for the other object images will be omitted. As shown in FIG. 11, the object image G1A is divided into a plurality of local regions PR in the same manner as that in the acquisition of the high-luminance region HR, and eight local regions PR in total are acquired. As a matter of course, it goes without saying that the division manner (the number of division, divided shape, or the like) may be different from that in the acquisition of the high-luminance region HR.

Next, the focus degree indicating the degree of focalization is calculated for each local region PR. In the present specification, the focus degree calculated thus from the local region PR is referred to as a "local focus degree" in order to be distinguished from the focus degree which is conventionally well-known, in other words, the focus degree calculated from the object image G1A. Specifically, in the present embodiment, eight local focus degrees are calculated.

As the local focus degree, for example, (1) an index value (average luminance value, contrast, edge strength, or the like) in accordance with the luminance of each of the pixels constituting the local region PR, (2) an index value obtained by multiplying the above index value by a coefficient in accordance with the area of the local region PR or the value, (3) an index value obtained by analytical calculation from the luminance histogram of the pixels constituting the local region PR, and the like which are conventionally well-known can be used. In the present embodiment, the luminance of each of pixels constituting the object image G1A is represented by gradations from 0 to 255, and the average luminance value for each local region PR is determined as the local focus degree. Therefore, as can be seen from the observation of the "local region" and the "local focus degree" in FIG. 11, being associated with each other, the local focus degree is relatively low across the entire object image G1A and the local focus degree corresponding to the image GC1 of the cells and the like C is slightly higher.

After the plurality of local focus degrees are obtained thus with respect to the object image G1A, the focus degree in the case where the imager 13 is positioned at the imager height H1 is calculated while correction is performed in accordance with the magnitude of the local focus degree. In the present embodiment, the correction value is calculated by multiplying the local focus degree by a coefficient in accordance with the magnitude of the local focus degree. In more detail, the above-described eight local focus degrees are sorted in order of the degree of focalization of the imager 13, and a plurality of correction values are calculated by multiplying the local focus degrees from the top to a predetermined order (top 50%) by a value ("1" in the present embodiment) larger than zero as the coefficient while values obtained by multiplying the remaining local focus degrees by zero as the coefficient are substantially excluded from the correction values to be used for the calculation of the focus degree. Specifically, among the "local focus degrees" in FIG. 11, the top four local focus degrees which are hatched are extracted as the correction values, and an average value of these values is obtained as the focus degree in the case where the imager 13 is positioned at the imager height H1. Further, the focus degree in the case where the imager 13 is positioned at each of the imager heights H2 to H4 is also obtained on the basis of the corresponding one of the object images G2A to G4A.

After the focus degree is obtained thus for each of the imager heights H1 to H4, the imager height with the highest focus degree is specified as the focusing position (the process corresponds to an example of the "step (c)"), like in the conventional technique. In a case, for example, where the focus degrees are distributed as shown in FIG. 11, the imager height H3 where the focus degree has the highest value is specified as the focusing position.

Herein, from a comparison between the second embodiment (the left end of FIG. 11) in which a value obtained by simply averaging the luminances of all the pixels constituting each of the object images G1A to G4A is determined as the focus degree and the present embodiment (the right end of FIG. 11), it can be found that the fifth embodiment has the following advantages. The second embodiment in which the luminances are simply averaged is easily affected by the background noise. For this reason, the amount of variation of the focus degree in accordance with the change of the imager height (H1 to H4) is small. In contrast to this, in the fifth embodiment, the focus degree for each of the object images G1A to G4A is obtained while excluding a region in which the local focus degree does not fall within the top 50%, i.e., the background noise region having high probability that the image GC1 of the cells and the like C is not included. For this reason, the amount of variation of the focus degree in accordance with the change of the imager height (H1 to H4) is large, and the focusing position can be detected more accurately. As a result, even when the object images G1A to G4A are relatively dark, it is possible to stably detect the focusing position without repeating detection operations.

Further, the present invention is not limited to the above-described embodiments, but numerous modifications and variations other than those described above can be devised without departing from the scope of the invention. For example, though the local focus degree and the focus degree at the imager height are calculated every time when the imager 13 is positioned at one of the imager heights H1 to H4 in the above-described embodiment A, the local focus degrees and the focus degrees at the respective imager heights may be collectively calculated after the acquisitions of the four object images G1 to G4 are completed.

Furthermore, though the saturation region SR is acquired every time when the imager 13 is positioned at one of the imager heights H1 to H4 in the above-described embodiment B, the saturation regions SR may be collectively calculated after the acquisitions of the four object images G1 to G4 are completed.

Further, though the above-described focusing position detection operation is performed by using the specific well 91 before the cells and the like C in the wells 91 are successively imaged in the above-described embodiments, the above-described focusing position detection operation may be performed every time when the cell in the well 91 is imaged.

Furthermore, though the distance from the imager 13 to the imaging object (cells and the like C) is changed by four levels in the above-described embodiments, the number of levels of the imager height is not limited to this but may be any given number only if it is multilevel.

Further, though the control program including the focusing position detection program is stored in the memory 145 in advance in the above-described embodiments, such a configuration may be achieved in which a reader 149 such as a disk drive or the like which is electrically connected to the interface (I/F) 142 reads an installation program. Specifically, the above-described focusing position detection program recorded in a non-transitory computer readable recording medium M such as a CD-ROM (Compact Disc Read Only Memory), a DVD-ROM (Digital Versatile Disc Read Only Memory), or the like to be inserted into the disk drive is computer-readable recorded and the disk drive may serve as the reader 149. In other words, even in a case where the imaging apparatus 1 cannot perform the above-described the focusing position detection method, the imaging apparatus 1 may be upgraded to perform the above-described focusing position detection method by incorporating the above-described focusing position detection program through installation thereof. Further, the focusing position detection program may be read by using a non-transitory computer readable recording medium other than the CD-ROM or the DVD-ROM as the recording medium M. Furthermore, the focusing position detection program may be read by using a communication part.

Although the invention has been described along with the specific embodiment above, this description is not intended to be interpreted in a limited sense. If the description of the invention is referred to, various modifications of the disclosed embodiment would be apparent to a person skilled in this art, similarly to other embodiments of the invention. Therefore, the appended claims are through to include these modifications or embodiments without departing from the true scope of the invention.

This invention is generally applicable to focusing position detection techniques for detecting a focusing position on the basis of a plurality of object images acquired by imaging an imaging object by using an imager while changing a focal position along an optical axis.

What is claimed is:

1. A focusing position detection method, comprising:
   (a) acquiring a plurality of object images by imaging an imaging object by using an imager while changing a focal position along an optical axis;
   (b) obtaining a focus degree indicating a degree of focalization, for each of the object images, on the basis of a plurality of local regions obtained by dividing the object image or an image obtained by excluding a saturation region having a luminance higher than a predetermined luminance from the object image;
   (c) specifying a focusing position on the basis of the plurality of focus degrees,
   wherein the step (b) includes:
      (b-1) dividing the object image into a plurality of local regions;
      (b-2) obtaining a local value indicating the degree of focalization from the local region for each of the plurality of local regions; and
      (b-3) obtaining the focus degree on the basis of the plurality of local values, and
   wherein the step (b-3) is a step of calculating a correction value, for each of the plurality of local values, by performing correction in accordance with a magnitude of the local value and calculating the focus degree from the plurality of correction values.

2. The focusing position detection method according to claim 1, wherein
   the step (b-3) is a step of calculating the correction value by multiplying the local value by a coefficient in accordance with the magnitude of the local value.

3. The focusing position detection method according to claim 2, wherein
   the step (b-3) is a step of sorting the plurality of local values in order of the degree of focalization of the imager and calculating the plurality of correction values by multiplying the local values from the top to a predetermined order by a value larger than zero as the coefficient, while excluding values obtained by multiplying the remaining local values by zero as the coefficient, from the correction values to be used for calculation of the focus degree.

4. The focusing position detection method according to claim 1, wherein
   the step (b-3) is a step of obtaining the focus degree by averaging the plurality of correction values.

5. A focusing position detection method, comprising:
   (a) acquiring a plurality of object images by imaging an imaging object by using an imager while changing a focal position along an optical axis;
   (b) obtaining a focus degree indicating a degree of focalization, for each of the object images, on the basis of a plurality of local regions obtained by dividing the object image or an image obtained by excluding a saturation region having a luminance higher than a predetermined luminance from the object image;
   (c) specifying a focusing position on the basis of the plurality of focus degrees,
   wherein the step (b) includes:
      (b-1) acquiring a saturation region having a luminance higher than a predetermined luminance from the plurality of object images;
      (b-2) obtaining a focus degree indicating the degree of focalization, for each of the plurality of object images, from an image obtained by excluding a saturation region from the object image; and (b-3) specifying a focusing position on the basis of the plurality of focus degrees, and wherein the step (b-2) includes:

(b-2-1) dividing the object image into a plurality of local images;

(b-2-2) obtaining a high-luminance region corresponding to the local image having a luminance higher than the predetermined luminance;

(b-2-3) obtaining an expanded high-luminance region which is obtained by expanding the high-luminance region by a predetermined amount; and (b-2-4) determining the saturation region on the basis of the expanded high-luminance region.

6. The focusing position detection method according to claim 5, wherein determination on whether or not the local image has a luminance higher than the predetermined luminance is performed on the basis of the number of pixels each having a luminance higher than the predetermined luminance among a plurality of pixels constituting the local image.

7. A focusing position detection method, comprising:

(a) acquiring a plurality of object images by imaging an imaging object by using an imager while changing a focal position along an optical axis;

(b) obtaining a focus degree indicating a degree of focalization, for each of the object images, on the basis of a plurality of local regions obtained by dividing the object image or an image obtained by excluding a saturation region having a luminance higher than a predetermined luminance from the object image;

(c) specifying a focusing position on the basis of the plurality of focus degrees, wherein the step (b) includes:

(b-1) acquiring a saturation region having a luminance higher than a predetermined luminance from the plurality of object images;

(b-2) obtaining a focus degree indicating the degree of focalization, for each of the plurality of object images, from an image obtained by excluding a saturation region from the object image; and (b-3) specifying a focusing position on the basis of the plurality of focus degrees, and wherein the step (b-2) includes:

(b-2-1) obtaining a high-luminance region having a luminance higher than the predetermined luminance;

(b-2-2) obtaining an expanded high-luminance region which is obtained by expanding the high-luminance region by a predetermined amount; and (b-2-3) determining the saturation region on the basis of the expanded high-luminance region.

8. A focusing position detector that detects a focusing position on the basis of a plurality of object images acquired by imaging an imaging object by using an imager while changing a focal position along an optical axis, the focusing position detector comprising:

a focus degree calculation part that calculates a focus degree indicating a degree of focalization of the imager, for each of the plurality of object images, on the basis of a plurality of local regions obtained by dividing the object image or an image obtained by excluding a saturation region having a luminance higher than a predetermined luminance from the object image; and a focusing position specifying part that specifies the focusing position on the basis of the plurality of focus degrees calculated by the focus degree calculation part, wherein the focus degree calculation part obtains a local value indicating the degree of focalization, for each of local regions acquired by dividing the object image, from the local region, and then obtains the focus degree on the basis of the plurality of local values, and wherein the focus degree calculation part calculates a correction value, for each of the plurality of local values, by performing correction in accordance with a magnitude of the local value and calculating the focus degree from the plurality of correction values.

9. A focusing position detector that detects a focusing position on the basis of a plurality of object images acquired by imaging an imaging object by using an imager while changing a focal position along an optical axis, the focusing position detector comprising:

a focus degree calculation part that calculates a focus degree indicating a degree of focalization of the imager, for each of the plurality of object images, on the basis of a plurality of local regions obtained by dividing the object image or an image obtained by excluding a saturation region having a luminance higher than a predetermined luminance from the object image;

a focusing position specifying part that specifies the focusing position on the basis of the plurality of focus degrees calculated by the focus degree calculation part; and a saturation region acquisition part that acquires a saturation region having a luminance higher than a predetermined luminance, from the plurality of object images, wherein the focus degree calculation part obtains a focus degree indicating the degree of focalization, for each of the plurality of object images, from an image obtained by excluding a saturation region from the object image, and wherein the focus degree calculation part divides the object image into a plurality of local images;

obtains a high-luminance region corresponding to the local image having a luminance higher than the predetermined luminance;

obtains an expanded high-luminance region which is obtained by expanding the high-luminance region by a predetermined amount; and determines the saturation region on the basis of the expanded high-luminance region.

10. A non-transitory computer readable recording medium having stored thereon a computer program configured to cause a computer to carry out the steps of claim 1.

11. A non-transitory computer readable recording medium having stored thereon a computer program configured to cause a computer to carry out the steps of claim 5.

12. A non-transitory computer readable recording medium having stored thereon a computer program configured to cause a computer to carry out the steps of claim 7.

13. A focusing position detector that detects a focusing position on the basis of a plurality of object images acquired by imaging an imaging object by using an imager while changing a focal position along an optical axis, the focusing position detector comprising:

a focus degree calculation part that calculates a focus degree indicating a degree of focalization of the imager, for each of the plurality of object images, on the basis of a plurality of local regions obtained by dividing the object image or an image obtained by excluding a saturation region having a luminance higher than a predetermined luminance from the object image;

a focusing position specifying part that specifies the focusing position on the basis of the plurality of focus degrees calculated by the focus degree calculation part; and a saturation region acquisition part that acquires a saturation region having a luminance higher than a predetermined luminance, from the plurality of object images, wherein the focus degree calculation part obtains a focus degree indicating the degree of focalization, for each of the plurality of object images, from an image obtained by excluding a saturation region from the object image, and wherein the focus degree calculation part
- obtains a high-luminance region having a luminance higher than the predetermined luminance;
- obtains an expanded high-luminance region which is obtained by expanding the high-luminance region by a predetermined amount; and
- determines the saturation region on the basis of the expanded high-luminance region.

\* \* \* \* \*